US012615663B2

(12) United States Patent
Ding et al.

(10) Patent No.: US 12,615,663 B2
(45) Date of Patent: Apr. 28, 2026

(54) METHOD FOR CHANNEL DETECTION, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Yi Ding, Dongguan (CN); Zhenshan Zhao, Dongguan (CN); Shichang Zhang, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 327 days.

(21) Appl. No.: 18/461,493

(22) Filed: Sep. 5, 2023

(65) Prior Publication Data

US 2023/0422300 A1     Dec. 28, 2023

Related U.S. Application Data

(63) Continuation of application No. PCT/CN2021/080273, filed on Mar. 11, 2021.

(51) Int. Cl.
*H04W 74/0808* (2024.01)

(52) U.S. Cl.
CPC .............................. *H04W 74/0808* (2013.01)

(58) Field of Classification Search
CPC . H04W 72/25; H04W 72/40; H04W 74/0808; H04W 72/0446; H04W 16/14; H04W 52/0209; H04W 72/20; H04W 76/28; H04W 72/12; H04W 72/1263; H04L 1/20
See application file for complete search history.

(56) References Cited

U.S. PATENT DOCUMENTS

2019/0313455 A1* 10/2019 Guey ..................... H04W 72/12
2020/0404629 A1* 12/2020 Wang .................... H04W 72/23
(Continued)

FOREIGN PATENT DOCUMENTS

| CN | 105704834 | 6/2016 |
| CN | 111130733 | 5/2020 |
| CN | 111756475 | 10/2020 |

(Continued)

OTHER PUBLICATIONS

"3rd Generation Partnership Project; Technical Specification Group Radio Access Network; Physical layer procedures for shared spectrum channel access (Release 16)," 3GPP TS 37.213, Dec. 2020, v16.4.0.

(Continued)

*Primary Examiner* — Marcus Smith
*Assistant Examiner* — Shivakrishna Vallamdasu
(74) *Attorney, Agent, or Firm* — Hodgson Russ LLP

(57) ABSTRACT

The disclosure provides a method for channel detection, a terminal device, and a non-transitory computer-readable storage medium. The method includes the following. Monitor a channel before a time-unit boundary and/or after the time-unit boundary, and determine, according to a channel monitoring result, whether to perform blind detection in a time unit next to the time-unit boundary.

8 Claims, 9 Drawing Sheets

(56) References Cited

U.S. PATENT DOCUMENTS

| 2021/0360621 | A1* | 11/2021 | Jiang | H04W 72/0446 |
| 2023/0035989 | A1* | 2/2023 | Awadin | H04W 74/0808 |

FOREIGN PATENT DOCUMENTS

| CN | 111865478 | 10/2020 |
| CN | 112153705 | 12/2020 |

OTHER PUBLICATIONS

"3rd Generation Partnership Project; Technical Specification Group Radio Access Network; NR; Physical channels and modulation (Release 16)," 3GPP TS 38.211, Dec. 2020, v16.4.0.
WIPO, International Search Report and Written Opinion for International Application No. PCT/CN2021/080273, Nov. 26, 2021.

* cited by examiner

MONITOR A CHANNEL STATE AT AN END OF A
FIRST TIME UNIT AND/OR A CHANNEL STATE
AT A START OF A SECOND TIME UNIT  — 101

DETERMINE, ACCORDING TO THE CHANNEL
STATE AT THE END OF THE FIRST TIME UNIT
AND/OR THE CHANNEL STATE AT THE START
OF THE SECOND TIME UNIT, WHETHER TO
PERFORM BLIND DETECTION IN THE SECOND
TIME UNIT  — 102

FIG. 7

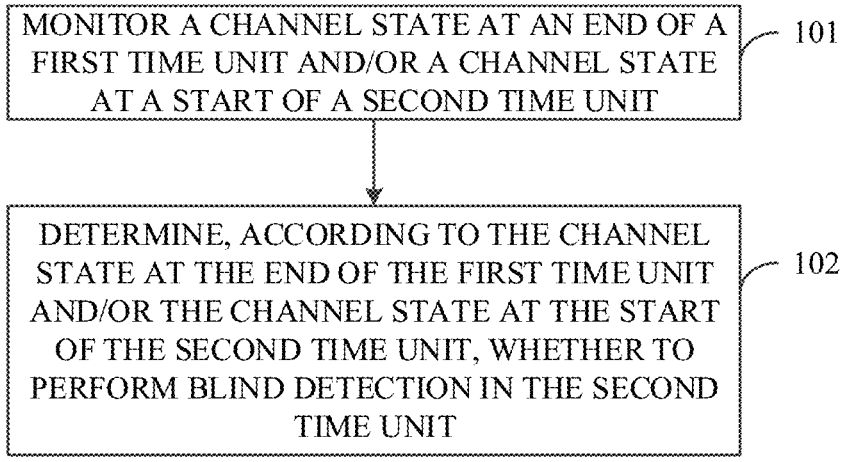

n-T1          n+T2

FIRST TIME
UNIT      SECOND TIME
UNIT

BOUNDARY n BETWEEN
TWO TIME UNITS

FIG. 8

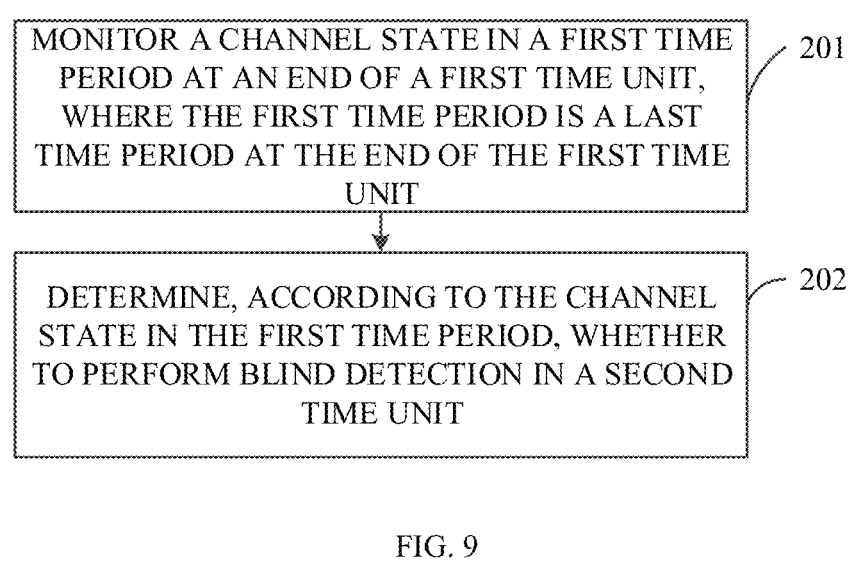

MONITOR A CHANNEL STATE IN A FIRST TIME PERIOD AT AN END OF A FIRST TIME UNIT, WHERE THE FIRST TIME PERIOD IS A LAST TIME PERIOD AT THE END OF THE FIRST TIME UNIT — 201

DETERMINE, ACCORDING TO THE CHANNEL STATE IN THE FIRST TIME PERIOD, WHETHER TO PERFORM BLIND DETECTION IN A SECOND TIME UNIT — 202

FIG. 9

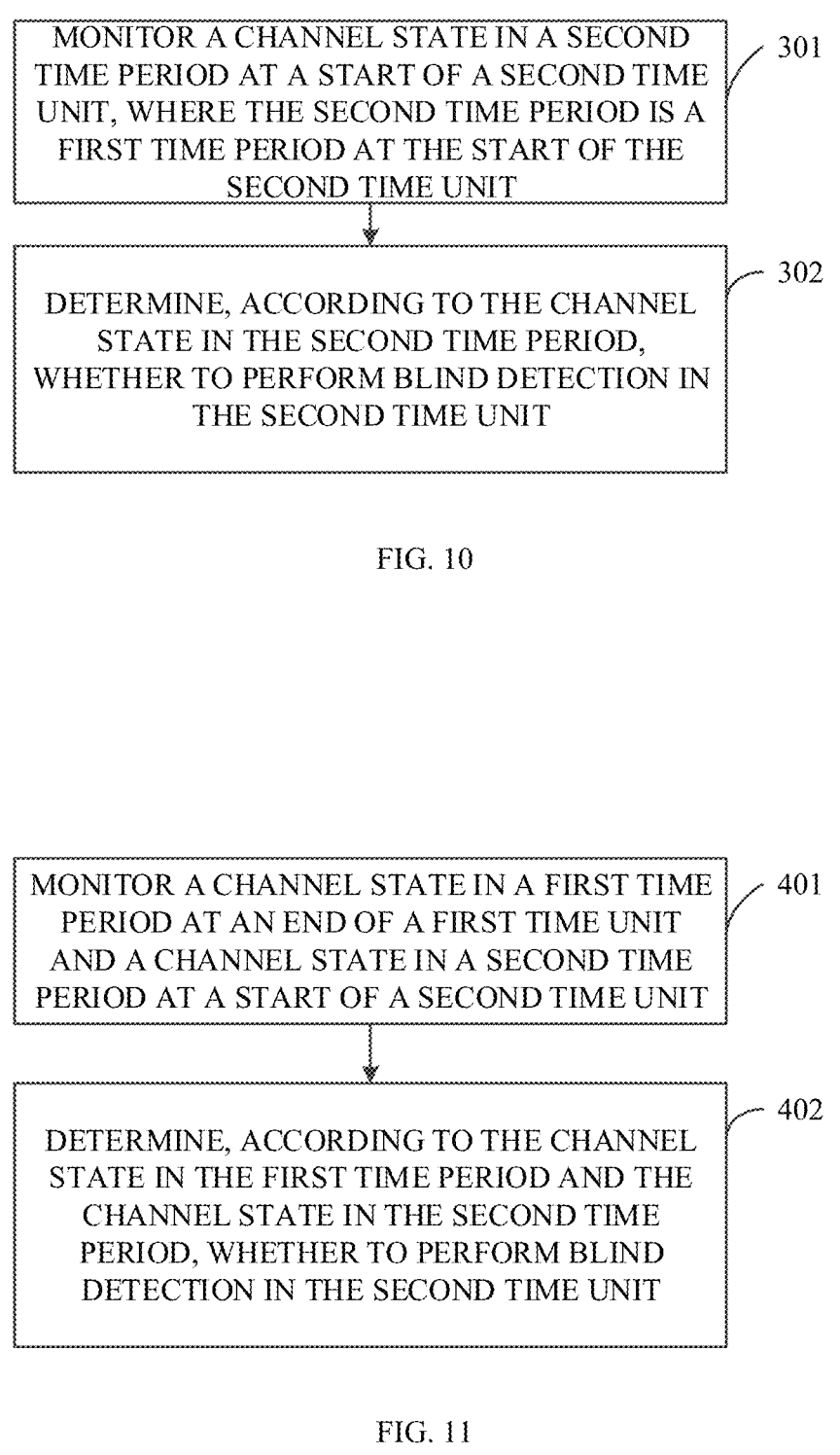

MONITOR A CHANNEL STATE IN A SECOND TIME PERIOD AT A START OF A SECOND TIME UNIT, WHERE THE SECOND TIME PERIOD IS A FIRST TIME PERIOD AT THE START OF THE SECOND TIME UNIT /⁓ 301

DETERMINE, ACCORDING TO THE CHANNEL STATE IN THE SECOND TIME PERIOD, WHETHER TO PERFORM BLIND DETECTION IN THE SECOND TIME UNIT ⸺ 302

FIG. 10

MONITOR A CHANNEL STATE IN A FIRST TIME PERIOD AT AN END OF A FIRST TIME UNIT AND A CHANNEL STATE IN A SECOND TIME PERIOD AT A START OF A SECOND TIME UNIT ⸺ 401

DETERMINE, ACCORDING TO THE CHANNEL STATE IN THE FIRST TIME PERIOD AND THE CHANNEL STATE IN THE SECOND TIME PERIOD, WHETHER TO PERFORM BLIND DETECTION IN THE SECOND TIME UNIT ⸺ 402

FIG. 11

METHOD FOR CHANNEL DETECTION, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2021/080273, filed Mar. 11, 2021, the entire disclosure of which is incorporated herein by reference.

TECHNICAL FIELD

Implementations of the disclosure relate to the field of communications technologies, and in particular, to a method for channel detection, a terminal device, and a non-transitory computer-readable storage medium.

BACKGROUND

As a key technology for the 5th generation mobile networks (5G), device-to-device (D2D) communication includes vehicle-to-vehicle (V2V) communication or vehicle-to-device (V2X) communication. The D2D communication introduces a sidelink (SL) transmission technology, and different from a traditional cellular system in which communication data is received or transmitted through a base station, a terminal-to-terminal direct communication mode is adopted, and thus higher spectrum efficiency and lower transmission delay can be achieved.

On an SL, since an SL user equipment (SL UE) does not know when other terminals may transmit data to the SL UE, the SL UE needs to perform blind detection in slots other than slots in which the SL UE performs transmission. When SL control information is detected through blink detection, the SL UE may perform demodulation according to the SL control information to obtain data transmitted by other terminals. The SL UE may consume relatively high power to perform blind detection.

SUMMARY

Implementations of the disclosure provide a method for channel detection, a terminal device, and a non-transitory computer-readable storage medium.

According to a first aspect, implementations of the disclosure provide a method for channel detection. The method includes determining, according to a channel state at an end of a first time unit and/or a channel state at a start of a second time unit, whether to perform blind detection in the second time unit, where the first time unit and the second time unit are consecutive in a time domain.

According to a second aspect, implementations of the disclosure provide a terminal device. The terminal device includes a processor and a memory configured to store a computer program. The processor is configured to execute the computer program to determine, according to a channel state at an end of a first time unit and/or a channel state at a start of a second time unit, whether to perform blind detection in the second time unit, where the first time unit and the second time unit are consecutive in a time domain.

According to a third aspect, implementations of the disclosure provide a non-transitory computer-readable storage medium. The computer-readable storage medium stores computer-executable instructions. The computer-executable instructions are executable by a processor to determine, according to a channel state at an end of a first time unit and/or a channel state at a start of a second time unit, whether to perform blind detection in the second time unit, where the first time unit and the second time unit are consecutive in a time domain.

BRIEF DESCRIPTION OF THE DRAWINGS

FIG. 7 is a first flow chart of a method for channel detection according to implementations of the disclosure.

FIG. 8 is a schematic diagram illustrating a time-unit boundary according to implementations of the disclosure.

FIG. 9 is a second flow chart of a method for channel detection according to implementations of the disclosure.

FIG. 10 is a third flow chart of a method for channel detection according to implementations of the disclosure.

FIG. 11 is a fourth flow chart of a method for channel detection according to implementations of the disclosure.

DETAILED DESCRIPTION

Figure 1:
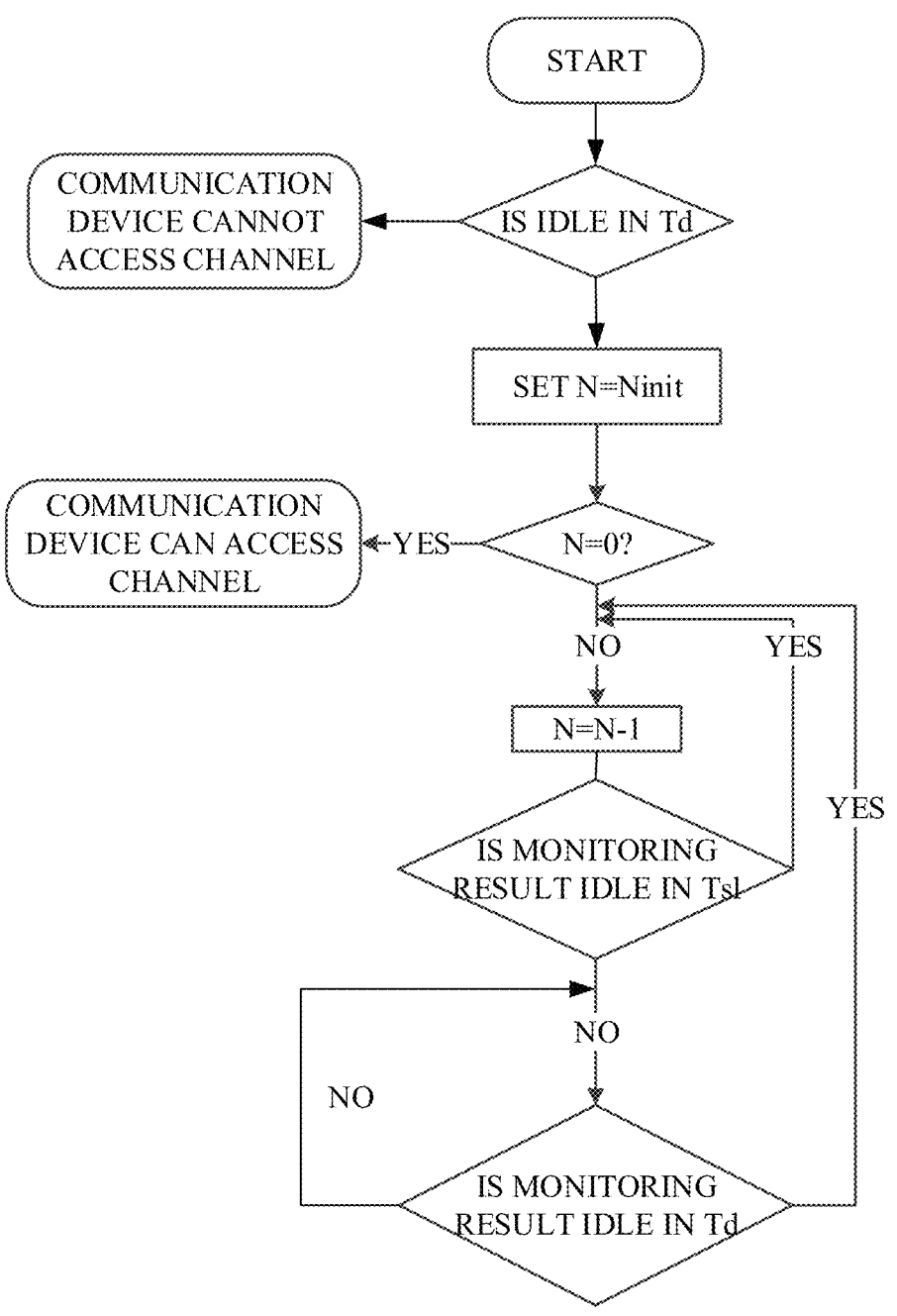
FIG. 1 is a schematic flow chart of a listen before talk (LBT) mechanism according to implementations of the disclosure.

To make the objectives, technical solutions, and advantages of implementations of the disclosure clearer, the following clearly and completely describes the technical solutions in the implementations of the disclosure with reference to the accompanying drawings in the implementations of the disclosure. Apparently, the implementations described are merely a part of rather than all the implementations of the disclosure. Based on the implementations of the disclosure, all other implementations obtained by a person of ordinary skill in the art without creative efforts shall belong to the scope of protection of the disclosure.

The terms "first" and "second" in the description, claims and accompanying drawings of the implementations of the disclosure are used to distinguish similar objects, and are not necessarily used to describe a specific sequence or order. It is to be understood that data so used may be interchanged in appropriate scenarios, so that the implementations of the disclosure described herein can be implemented in a sequence other than illustrated or described herein. In addition, the terms "include", "comprise", "have" and any variations thereof, are intended to cover a non-exclusive inclusion, for example, a process, method, system, product, or apparatus that includes a series of steps or units is not necessarily limited to those steps or units that are explicitly listed, but may include other steps or units that are not explicitly listed or inherent to such process, method, product, or apparatus.

With the increase of the number of terminals and the increase of mobile data services, licensed band resources are increasingly lacking, and at present, it is considered to deploy a sidelink (SL) communication to an unlicensed band. An unlicensed band is a spectrum divided according to nations and regions and used for communication of radio devices. The spectrum is generally regarded as a shared spectrum, that is, communication devices in different communication systems can use the spectrum and may not to $CW_P$ is related to a priority of a channel to be accessed by a communication device. $CW_P$ may also be referred to as a contention window (CW) corresponding to a specific priority or a CW determined according to a priority. The communication device determines a value of CWmin, p, a value of CWmax, p, and allowable values of $CW_P$ according to a priority of a channel to be accessed by the communication device, i. e., determine a minimum value, a maximum value, and possible values of a CW according to the priority. For example, in Table 1, when a priority of a channel to be accessed by the communication device is 3, a minimum value, a maximum value, and possible values of a CW used by the communication device are 15, 1023, and {15, 31, 63, 127, 255, 511, 1023}, respectively.

TABLE 1

| Priority of channel access | $m_p$ | $CW_{min,p}$ | $CW_{max,p}$ | $T_{mcot,p}$ | Allowable values of $CW_p$ |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} | apply for an exclusive spectrum license as long as these communication devices satisfy requirements on the spectrum set by the nations or regions. For example, a wireless fidelity (WiFi) system is deployed on an unlicensed spectrum.

At present, there is a limitation on a bandwidth for a communication device to perform transmission on an unlicensed spectrum, that is, the span of the bandwidth occupied by the communication device for data transmission is at least L % of the total spectral bandwidth, and L is usually required to be equal to 80. Exemplarily, a total spectral bandwidth is 100 physical resource blocks (PRBs), and when the communication device transmits data, a difference between a lowest PRB index and a highest PRB index is at least 80. In the case that the communication device needs 2 PRBs to transmit data, an index of one PRB is 1, and an index of the other PRB is at least 81. In some cases, it only needs to satisfy that the occupied bandwidth for the communication device to perform transmission is at least 2 megahertz (MHz).

In an unlicensed band, a device in a WiFi system and a device in a sidelink in the unlicensed spectrum (SL-U) system both use a listen before talk (LBT) mechanism for accessing to a channel, that is, perform monitoring before accessing to the channel, and access to the channel when the channel is idle. The LBT mechanism includes at least the following.

Type 1: a communication device first monitors a channel in a time period with a duration of Td, and upon monitoring that all monitoring slots in the time period are idle, and N is equal to 0 in FIG. 1, it is determined that LBT succeeds, and the communication device can occupy the channel to transmit data, otherwise, the communication device cannot access to the channel.

Exemplarily, FIG. 1 is a schematic flow chart of an LBT mechanism according to implementations of the disclosure. As illustrated in FIG. 1, the LBT mechanism mainly includes the following.

Operation 1, upon monitoring that all monitoring slots in the time period with the duration of Td are idle, set N=$N_{init}$, where $N_{init}$ is a random value ranging from 0 to CWp, and then proceed to operation 4.

$T_d=T_f+m_p×T_{s1}$, where $T_f$ can be 16 μs, $T_{s1}$ can be 9 μs, $m_p$ is related to a priority of a channel to be accessed, and $m_p$ can be determined according to Table 1.

In practical applications, the communication device maintains the size of a CW corresponding to each priority, adjusts the CW corresponding to each priority according to a certain rule before performing operation 1 each time, and then determines a CW used for current LBT according to a priority of channel access, thereby determining $N_{init}$. Exemplarily, the communication device maintains CW1, CW2, CW3, and CW4. In the case that the communication device performs type 1 LBT, before operation 1, the communication device increases each of CW1, CW2, CW3, and CW4 to the next larger allowable value. When a priority of a channel to be accessed by the communication device this time is 1, the communication device performs type 1 LBT this time through using the CW1 adjusted.

Operation 2, when N>0, the communication device decreases N by 1, that is, N=N−1.

Operation 3, continue to monitor a channel state in a monitoring slot with a duration of Ts1, and when the channel state is idle, proceed to operation 4, otherwise, proceed to operation 5.

Operation 4, when N=0, stop monitoring, and at this point the communication device can access to a channel, otherwise, jump to operation 2.

Operation 5, continue channel monitoring until in a time period with a monitoring duration of Td a monitoring slot is monitored to be busy, or all monitoring slots in the time period with the monitoring duration of Td are monitored to be idle.

Operation 6, when all the monitoring slots in the time period with the monitoring duration of Td are idle, then jump to operation 4, otherwise, jump to operation 5.

If no jump is noted, the above operations are executed sequentially.

In the case that the communication device executes the described operations and LBT succeeds, and the communication device does not access to a channel immediately, when the communication device needs to access to the channel to transmit data, the communication device does not need to perform all operations of type 1 LBT again, and only needs to monitor channel occupancy in a time period with a duration of Td+at least one Ts1, and when the channel is idle, the communication device can directly access to the channel to transmit data.

After the communication device accesses to a channel in the case of successful LBT, the communication device occupies the channel for a time which is referred to as a channel occupancy time (COT). In the COT, the communication device may perform continuous transmission or discontinuous transmission, but a total transmission time does not exceed $T_{mcot, p}$, and $T_{mcot, p}$ is related to a priority of channel access, for example, can be determined through looking up Table 1.

In addition, after the communication device accesses to a channel, the communication device transmits data in the COT, and can share an unused part of the COT with another communication device. For example, when the other communication device receives the shared COT, the other communication device can perform type 2 LBT for a fixed time length without performing type 1 LBT, and thus the other communication device can quickly access to the channel and perform transmission in the shared COT.

Type 2: different from type 1, for type 2 LBT the communication device is only required to monitor a channel for a fixed time length. When monitoring slots are idle in the fixed time length, the communication device may directly access to the channel. Specifically, type 2 is classified into three sub-types: type 2A, type 2B, and type 2C.

Type 2A: the communication device can monitor a channel for 25 μs (denoted as Tshort), and when all monitoring slots in the Tshort are idle, the communication device can directly access to the channel.

Type 2B: the communication device can monitor a channel for 16 μs (denoted as Tf), and when all monitoring slots in the Tf are idle, the communication device can directly access to the channel.

Type 2C: the communication device can directly access to a channel without LBT, and type 2C can only be applied to the case where a time interval between this transmission and the last transmission is less than or equal to 16 μs, and duration of this transmission does not exceed 584 μs.

Figures 2, 3:
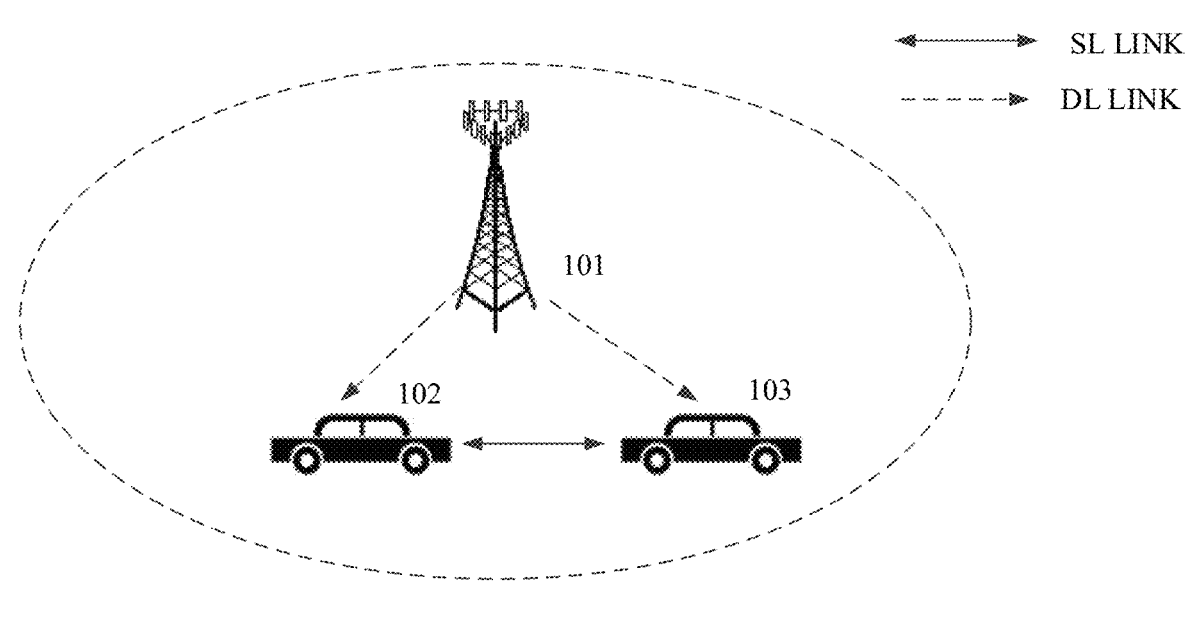
FIG. 2 is a first schematic diagram illustrating a scenario of a method for channel detection according to implementations of the disclosure.
FIG. 3 is a second schematic diagram illustrating a scenario of a method for channel detection according to implementations of the disclosure.
Figure 4:
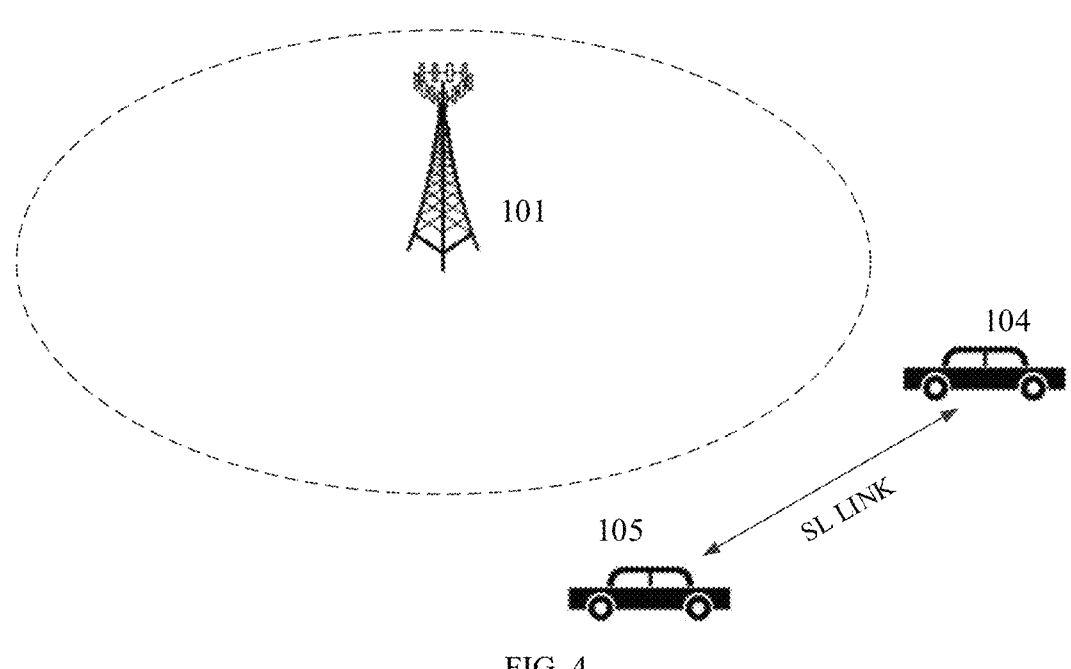
FIG. 4 is a third schematic diagram illustrating a scenario of a method for channel detection according to implementations of the disclosure.

FIG. 2 is a first schematic diagram illustrating a scenario of a method for channel detection according to implementations of the disclosure, FIG. 3 is a second schematic diagram illustrating a scenario of a method for channel detection according to implementations of the disclosure, and FIG. 4 is a third schematic diagram illustrating a scenario of a method for channel detection according to implementations of the disclosure. FIGS. 2 to 4 illustrate several scenarios of SL transmission.

A communication system illustrated in FIG. 2 includes a network device 101 and two terminal devices, which are terminal devices 102 and 103, respectively. Both the terminal device 102 and the terminal device 103 are within coverage of the network device 101. The network device 101 communicates with the terminal device 102 and the terminal device 103, respectively, and the terminal device 102 communicates with the terminal device 103. Exemplarily, the terminal device 102 can transmit a communication message to the terminal device 103 through the network device 101, and the terminal device 102 can also directly transmit a communication message to the terminal device 103. A direct communication link between the terminal device 102 and the terminal device 103 is referred to as a device-to-device (D2D) link, and may also be referred to as a proximity service (ProSe) link, an SL, and the like. Transmission resources on the D2D link may be allocated by the network device.

The communication system illustrated in FIG. 3 also includes one network device 101 and two terminal devices. Different from FIG. 2, the terminal device 103 is within the coverage of the network device 101, and the terminal device 104 is located outside the coverage of the network device 101. The network device 101 communicates with the terminal device 103, and the terminal device 103 communicates with the terminal device 104. Exemplarily, the terminal device 103 can receive configuration information transmitted by the network device 101, and perform SL communication according to the configuration information. Since the terminal device 104 cannot receive the configuration information transmitted by the network device 101, the terminal device 104 can perform SL communication according to pre-configured information and information carried on a physical sidelink broadcast channel (PSBCH) transmitted by the terminal device 103.

As illustrated in FIG. 4, both the terminal device 104 and a terminal device 105 are located outside the coverage of the network device 101. Both the terminal device 104 and the terminal device 105 can determine SL configuration according to pre-configured information, to perform SL communication.

The above-mentioned terminal device may be a device having a wireless transceiving function, and may be deployed on land, including indoor or outdoor, handheld or vehicle-mounted; the terminal device may be deployed on water (such as a ship), or may be deployed in the air (such as an airplane, a balloon, and a satellite). The terminal device may be a user equipment (UE), where the UE includes a device with a wireless communication function such as a handheld device, a vehicle-mounted device, a wearable device, or a computing device. Exemplarily, the UE may be a mobile phone, a tablet computer, or a computer with a wireless transceiving function, and the terminal device may also be a virtual reality (VR) terminal device, an augmented reality (AR) terminal device, a wireless terminal in industrial control, a wireless terminal in autonomous driving (a vehicle-mounted terminal), a wireless terminal in telemedicine, a wireless terminal in a smart grid, a wireless terminal in a smart city, a wireless terminal in a smart home, or the like. In the implementations of the disclosure, an apparatus for implementing functions of a terminal may be a terminal, or may be an apparatus capable of supporting the terminal to implement the functions, for example, a chip system, and the apparatus may be installed in the terminal. In the implementation of the disclosure, the chip system may be formed by a chip, or may include a chip and other discrete components.

The network device may include a base station (BS), which may be a device deployed in a radio access network and capable of performing wireless communication with a terminal. The base station may have various forms, such as a macro base station, a micro base station, a relay station, and an access point. Exemplarily, the base station involved in the implementations of the disclosure may be a base station in a fifth generation (5G) or in a long term evolution (LTE), where the base station in the 5G may also be referred to as a transmission reception point (TRP) or a gNB. In the implementations of the disclosure, an apparatus for implementing functions of a network device may be a network device, or may be an apparatus capable of supporting the network device to implement the functions, for example, a chip system, and the apparatus may be installed in the network device.

Regarding SL transmission, two transmission modes are defined in the 3rd generation partnership project (3GPP) protocol: a first transmission mode and a second transmission mode.

First transmission mode: transmission resources for a terminal device are allocated by a base station, and the terminal device transmits data on an SL according to resources allocated by the base station. The base station may allocate resources for a single transmission to the terminal device, or may allocate a semi-persistent transmission resource to the terminal device. Exemplarily, the terminal device 102 illustrated in FIG. 2 is located within the coverage of the network device 101, and the network device 101 allocates transmission resources for SL transmission to the terminal device 102.

Second transmission mode: (1) In the case that the terminal device has a sensing capability, data can be transmitted in a sensing-reservation manner or in a random resource selection manner. Specifically, the foregoing sensing-reservation manner refers to that the terminal device may obtain, through sensing, an available resource set from a resource pool configured by a network or a resource pool pre-configured, and randomly select a resource for data transmission from the available resource set. (2) In the case that the terminal device does not have a sensing capability, the terminal device can directly randomly select a transmission resource from a resource pool.

The above-mentioned sensing refers to that the terminal device receives first SL control information transmitted by another terminal device, knows resources reserved for the other terminal device according to an indication in the first SL control information, and excludes the resources reserved for the other terminal device in the case of resource selection, and thus resource collision between the terminal device and the other terminal device can be avoided.

Exemplarily, the terminal device 102 illustrated in FIG. 2 may autonomously select a transmission resource from a resource pool configured by a network to perform SL transmission. As illustrated in FIG. 4, both the terminal devices 104 and 105 are located outside the coverage of the network device 101, and the terminal devices 104 and 105 each can autonomously select a transmission resource for SL transmission from a resource pool pre-configured.

A frame structure used in SL transmission is briefly introduced in the following. Exemplarily, FIG. 5 is a first schematic diagram illustrating a frame structure used in an SL system according to implementations of the disclosure, and FIG. 6 is a second schematic diagram illustrating a frame structure used in an SL system according to implementations of the disclosure.

Figure 5:
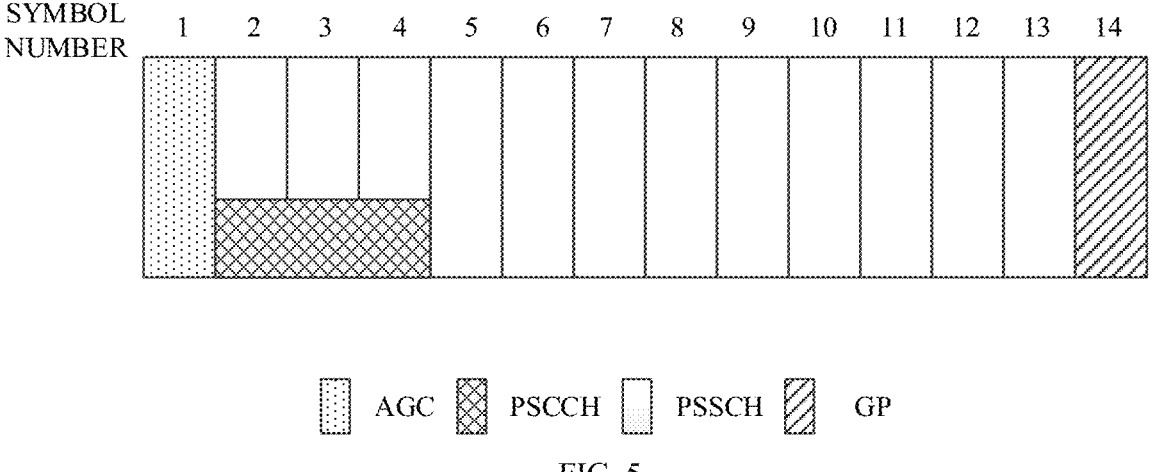
FIG. 5 is a first schematic diagram illustrating a frame structure in a sidelink (SL) system according to implementations of the disclosure.
Figure 6:
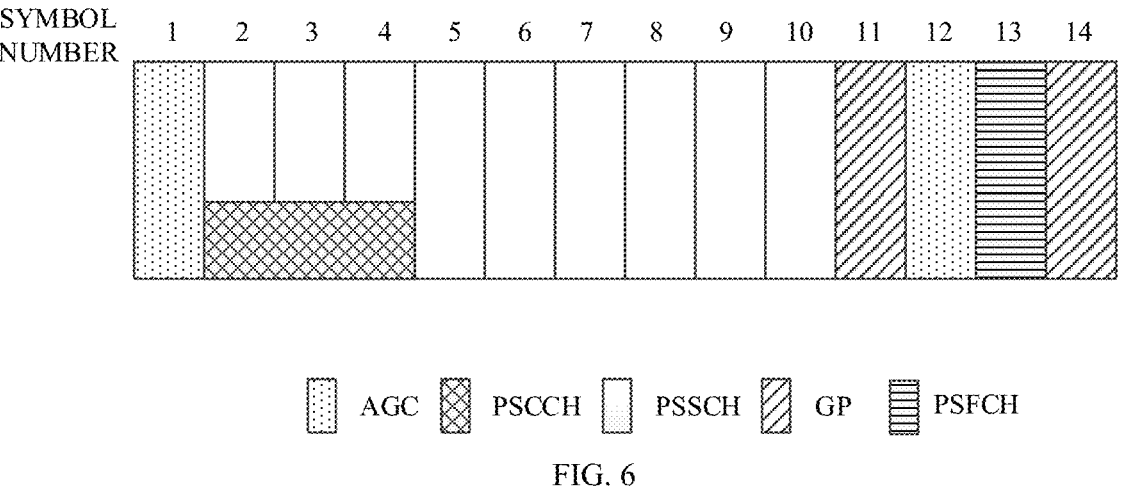
FIG. 6 is a second schematic diagram illustrating a frame structure in an SL system according to implementations of the disclosure.

As illustrated in FIG. 5, a first symbol of a slot is an automatic gain control (AGC) symbol. When a terminal device performs data reception, the terminal device can adjust a receive power in the AGC symbol to be a power suitable for demodulation. When the terminal device performs data transmission, the terminal device can repeatedly transmit in the AGC symbol content to be transmitted in a symbol after the AGC symbol. In FIG. 5, a physical sidelink control channel (PSCCH) is used to carry first SL control information, and the first SL control information mainly includes a field related to resource sensing. A physical sidelink shared channel (PSSCH) is used to carry data and second SL control information, and the second side control information mainly includes a field related to data demodulation. Generally, the last symbol in a slot is a guard period (GP) symbol, i. e., a GAP (interval), and the terminal device performs transmission-reception switching in the GP symbol and does not perform transmission. As illustrated in FIG. 5, a symbol next to the last symbol carrying the PSSCH is a GP symbol.

In a slot, there may be a symbol corresponding to a physical SL feedback channel (PSFCH), and the PSFCH is used for transmitting feedback information of hybrid automatic repeat request (HARQ). As illustrated in FIG. 6, different from the slot structure in FIG. 5, the second last symbol of the slot carries the PSFCH. Since the terminal device may transmit data on the PSSCH and receives data on the PSFCH, a GP symbol is needed for transmission-reception switching, and thus there is a GP symbol between the symbol carrying the PSFCH and a symbol carrying the PSSCH. In addition, there may be an AGC symbol between the symbol carrying the PSFCH and the GP symbol between the symbol carrying the PSFCH and the symbol carrying the PSSCH, where the ACG symbol is used for receiving the PSFCH, and a symbol next to the symbol carrying the PSFCH is a GP symbol. Depending on resource pool configuration, symbols corresponding to the PSFCH may appear once every 1, 2, or 4 slots.

With regard to an SL UE, since the SL UE does not known when another UE may transmit data to the SL UE, the SL UE needs to blindly detect first SL control information and/or second SL control information in slots other than slots for transmission, and then perform demodulation to obtain data transmitted by the other UE in the case that SL control information is detected through blind detection. The SL UE may consume relatively high power to perform blind detection. In an SL system in a licensed spectrum, the 3GPP introduces a discontinuous reception (DRX) mechanism and the like, to reduce the number of slots in which the SL UE needs to perform blind detection, thereby reducing power consumption and achieving power saving. When the SL system is deployed in an unlicensed spectrum, that is, is an SL-U system, some mechanisms need to be designed to reduce the number of slots in which the SL UE needs to perform blind detection.

With regard to the described problem, implementations of the disclosure provide a method for channel detection, which is mainly for a terminal device in an SL system. When the SL system is deployed in an unlicensed spectrum, multiple kinds of communication devices may exist in the unlicensed spectrum, for example, a WiFi device or an SL UE may exist. The Wi-Fi device and the SL UE both need to perform LBT, and can access to a channel for data transmission only in the case of successful LBT. For example, for a certain time unit, in the case that the WiFi device performs data transmission in the time unit, the SL UE cannot successfully access to a channel, that is, no SL transmission is performed in the time unit, and the SL UE in a receiving state does not need to perform blind detection in the time unit, which reduces the number of times of blind detection that needs to be performed by the SL UE, thereby reducing the power consumption of the SL UE. Based on the described idea, the SL UE can perform channel monitoring in a time-unit boundary, and determine whether there is SL transmission in a next time unit according to a channel monitoring result, and in the case that there is no SL transmission in the next time unit, the SL UE does not need to perform blind detection in the next time unit, thereby reducing the power consumption of the SL UE.

The technical solutions of the disclosure will be described below in detail with reference to several implementations in conjunction with the accompanying drawings. The following specific implementations may be combined with each other, and same or similar concepts or processes will not be repeated in certain implementations.

FIG. 7 is a first flow chart of a method for channel detection according to implementations of the disclosure, and FIG. 8 is a schematic diagram illustrating a time-unit boundary according to implementations of the disclosure.

As illustrated in FIG. 7, the method provided in the implementations may be applicable to any terminal device in FIG. 2 to FIG. 4. The terminal device is an SL device. The method includes the following.

At 101, monitor a channel state at an end of a first time unit and/or a channel state at a start of a second time unit.

At 102, determine, according to the channel state at the end of the first time unit and/or the channel state at the start of the second time unit, whether to perform blind detection in the second time unit.

The first time unit and the second time unit are consecutive in a time domain.

Exemplarily, the first time unit is before the second time unit. As illustrated in FIG. 8, a boundary moment between the first time unit and the second time unit is denoted as n, the end of the first time unit may be understood as a time period from n−T1 to n, and the start of the second time unit may be understood as a time period from n to n+T2.

Exemplarily, a value of T1 may be equal to $T_{s1}$, $T_d$, or $T_f$ described above, and a value of T2 may also be equal to $T_{s1}$, $T_d$, or $T_f$ described above. T1 and T2 may be the same or different.

Exemplarily, the time unit may be a radio frame, a subframe, a slot, a symbol, or a half-frame. Structures of the first time unit and the second time unit may be the same or different. Exemplarily, the first time unit is a slot, and the second time unit is a symbol. Alternatively, both the first time unit and the second time unit are slots.

Exemplarily, the first time unit is any time unit.

Exemplarily, the second time unit is a time unit in which the terminal device performs reception, or a time unit in which the terminal device performs no transmission. Alternatively, the second time unit may be any time unit. Alternatively, the second time unit may be the first symbol for SL transmission in a slot.

In the implementations of the disclosure, the terminal device may monitor only the channel state at the end of the first time unit, and determine, according to the channel state at the end of the first time unit, whether to perform blind detection in the second time unit.

In an implementation of the present disclosure, the terminal device may monitor only the channel state at the start of the second time unit, and determine, according to the channel state at the start of the second time unit, whether to perform blind detection in the second time unit.

In an implementation of the disclosure, the terminal device may monitor both the channel state at the end of the first time unit and the channel state at the start of the second time unit, and determine, according to the channel state at the end of the first time unit and the channel state at the start of the second time unit, whether to perform blind detection in the second time unit.

In an implementation of the present disclosure, upon that the channel state at the end of the first time unit is monitored, the terminal device can further determine, according to the channel state at the end of the first time unit, whether to monitor the channel state at the start of the second time unit, to determine whether to perform blind detection in the second time unit.

In the implementation, a channel state may include an idle state or a busy state. The terminal device can perform channel measurement and determine whether a channel state is idle or busy according to a channel measurement value.

Exemplarily, a channel measurement value at the end of the first time unit is monitored, and the channel state at the end of the first time unit is determined according to the channel measurement value at the end of the first time unit. Similarly, a channel measurement value at the start of the second time unit is monitored, and the channel state at the start of the second time unit is determined according to the channel measurement value at the start of the second time unit.

A channel measurement value may include a channel energy value or a channel power value. Specifically, when the terminal device detects that a channel energy value/channel power value in a certain time period is less than or equal to a first threshold, a channel state in the time period is determined to be an idle state. When the terminal device detects that a channel energy value/channel power value in a certain time period is greater than or equal to a second threshold, a channel state in the time period is determined to be a busy state. It is to be noted that, the channel energy value mentioned above may refer to receive energy measured by the terminal device, and the channel power value mentioned above may refer to receive power measured by the terminal device.

Exemplarily, when the channel measurement value at the end of the first time unit is less than or equal to the first threshold, the channel state at the end of the first time unit is determined to be idle. When the channel measurement value at the end of the first time unit is greater than or equal to the second threshold, the channel state at the end of the first time unit is determined to be busy. Based on the same principle, the channel state at the start of the second time unit can be determined.

The first threshold or the second threshold may be configured by a network, pre-configured, a preset value specified in a standard, or depends on an implementation of the terminal device. The first threshold and the second threshold may be the same or different.

Exemplarily, as illustrated in FIG. 8, when a channel state in at least one monitoring slot from n−T1 to n is busy, it is determined that a channel state from n−T1 to n is busy. When channel states in all monitoring slots from n−T1 to n are idle, it is determined that the channel state from n−T1 to n is idle. When a channel state in at least one monitoring slot from n to n+T2 is busy, it is determined that a channel state from n to n+T2 is busy. When channel states in all monitoring slots from n to n+T2 are idle, it is determined that the channel state from n to n+T2 is idle.

Exemplarily, the length of a monitoring slot is $T_{s1}$, for example, 9 μs.

Exemplarily, when a channel state in a part of the time length of a monitoring slot is busy, it is determined that a channel state in the monitoring slot is busy.

Exemplarily, when a channel state in a part of a time length of a monitoring slot is idle, a channel state in the monitoring slot is idle.

In the implementation, performing blind detection in the second time unit includes detecting at least one of: a PSCCH, a physical downlink control channel (PDCCH), a PSSCH, a PSFCH, a PSBCH, first SL control information, or second SL control information. The first SL control information is carried on a PSCCH, and the second SL control information is carried on a PSSCH.

Exemplarily, as illustrated in FIG. 8, performing blind detection in the second time unit may refer to performing blind detection after a time period at the start of the second time unit, that is, perform blind detection in the second time unit after n+T2.

Exemplarily, performing blind detection in the second time unit may refer to performing blind detection at the start of the second time unit.

Exemplarily, performing no blind detection in the second time unit may refer to performing no blind detection at the start of the second time unit.

Exemplarily, performing no blind detection in the second time unit may refer to performing blind detection in a time period at the start of the second time unit, but stopping blind detection after the time period at the start of the second time unit.

According to the method for channel detection provided in the implementations of the disclosure, the terminal device performs channel monitoring before a time-unit boundary and/or after the time-unit boundary, and determines, according to a channel monitoring result, whether to perform blind detection in a time unit next to the time-unit boundary. With the method for channel detection, the number of time units in which the terminal device needs to perform blind detection can be reduced, thereby reducing power consumption of the terminal device.

The foregoing several possible implementations are described in detail below with reference to FIGS. 9 to 12.

FIG. 9 is a second flow chart of a method for channel detection according to implementations of the disclosure. As illustrated in FIG. 9, the method includes the following.

At 201, monitor a channel state in a first time period at an end of a first time unit, where the first time period is a last time period at the end of the first time unit.

Exemplarily, the first time period at the end of the first time unit is a time period from n−T1 to n.

At 202, determine, according to the channel state in the first time period at the end of the first time unit, whether to perform blind detection in a second time unit.

In an implementation of the disclosure, when the channel state in the first time period at the end of the first time unit is idle, determine to perform blind detection in the second time unit.

In an implementation of the disclosure, when the channel state in the first time period at the end of the first time unit is busy, determine to perform no blind detection in the second time unit.

Exemplarily, taking that the first time unit is a slot as an example, it can be seen from FIG. 5 or FIG. 6 that an end of a slot in an SL system includes a GP symbol. When a channel is monitored to be busy in the GP symbol, it may be determined that a device in an inter-system such as a WiFi system performs data transmission on the channel, and it is possible that the device in the WiFi system may continue data transmission in a next slot.

Based on the foregoing scenario, in the implementation, the channel state in the first time period at the end of the first time unit is monitored. When the channel state in the first time period is busy, it indicates that a channel is occupied, and a terminal device performs no blind detection in a next time unit. When the channel state in the first time period is normal, it indicates that the channel is not occupied, and the terminal device needs to perform blind detection in the next time unit.

FIG. 10 is a third flow chart of a method for channel detection according to implementations of the disclosure. As illustrated in FIG. 10, the method includes the following.

At 301, monitor a channel state in a second time period at a start of a second time unit, where the second time period is a first time period at the start of the second time unit.

Exemplarily, the second time period at the start of the second time unit is a time period from n to n+T2.

At 302, determine, according to the channel state in the second time period at the start of the second time unit, whether to perform blind detection in the second time unit.

In an implementation of the disclosure, when the channel state in the second time period at the start of the second time unit is idle, determine to perform no blind detection in the second time unit.

In an implementation of the disclosure, when the channel state in the second time period at the start of the second time unit is busy, determine to perform blind detection in the second time unit.

Exemplarily, taking that the second time unit is a slot as an example, it can be seen from FIG. 5 or FIG. 6 that a start of a slot in an SL system includes an AGC symbol. When a channel is monitored to be busy in the AGC symbol, it may be determined that another device in an SL system or a device in an inter-system such as a WiFi system performs data transmission on the channel. A terminal device may therefore determine that there may be another device on the SL perform data transmission in the slot, and thus the terminal device needs to perform blind detection in the slot. On the contrary, when the channel is monitored to be idle in the AGC symbol, it may be determined that no other device in the SL system or no device in the inter-system such as the WiFi system performs data transmission in the slot, and the terminal device does not need to perform blind detection in the slot.

Based on the foregoing scenario, in this implementation, the channel state in the second time period at the start of the second time unit is monitored. When the channel state in the second time period is idle, it indicates that no channel is occupied, and the terminal device does not need to perform blind detection. When the channel state in the second time period is busy, it indicates that a channel is occupied, and the terminal device needs to perform blind detection in the second time unit.

FIG. 11 is a fourth flow chart of a method for channel detection according to implementations of the disclosure. As illustrated in FIG. 11, the method includes the following.

At 401, monitor a channel state in a first time period at an end of a first time unit and a channel state in a second time period at a start of a second time unit.

The first time period is a last time period at the end of the first time unit, and the second time period is a first time period at the start of the second time unit.

At 402, determine, according to the channel state in the first time period at the end of the first time unit and the channel state in the second time period at the start of the second time unit, whether to perform blind detection in the second time unit.

In an implementation of the disclosure, when the channel state in the second time period at the start of the second time unit is idle, determine to perform no blind detection in the second time unit.

In the implementation, although channel states in time periods before and after a time-unit boundary is monitored, as long as the channel state in the second time period at the start of the second time unit is idle, a terminal device does not need to perform blind detection.

Optionally, when the channel state in the second time period at the start of the second time unit is idle, determine to perform no blind detection in the second time unit as follows. When the channel state in the second time period at the start of the second time unit is idle and the channel state in the first time period at the end of the first time unit is idle, determine to perform no blind detection in the second time unit.

Optionally, when the channel state in the second time period at the start of the second time unit is idle, determine to perform no blind detection in the second time unit as follows. When the channel state in the second time period at the start of the second time unit is idle and the channel state in the first time period at the end of the first time unit is busy, determine to perform no blind detection in the second time unit.

In an implementation of the present disclosure, when the channel state in the first time period at the end of the first time unit is busy and the channel state in the second time period at the start of the second time unit is busy, determine to perform no blind detection in the second time unit.

Exemplarily, taking that both the first time unit and the second time unit are slots as an example, it can be seen from FIG. 5 or FIG. 6 that an end of a slot in an SL system includes a GP symbol, and when a channel is monitored to be busy in the GP symbol, it may be determined that a device in an inter-system such as a WiFi system performs data transmission on the channel. In one case, the device in the WiFi system just completes data transmission at the end of the slot, and thus there is no device in the WiFi system that will occupy the channel at the start of the next slot. In another case, the device in the WiFi system does not complete data transmission at the end of the slot, and thus the device in the WiFi system will occupy the channel at the start of the next slot to continue data transmission, and in this case, there is no SL transmission in the next slot.

Considering the above two cases, in the implementation, the channel state in the first time period at the end of the first time unit is monitored, and the channel state in the second time period at the start of the second time unit is monitored, and when the channel state in the first time period is busy and the channel state in the second time period is also busy, except the first case, it is very likely that the channel will be consecutively occupied by the WiFi device, Therefore, there is no SL transmission in the second time unit, and the terminal device does not need to perform blind detection in the second time unit.

In an implementation of the disclosure, when the channel state in the first time period at the end of the first time unit is idle and the channel state in the second time period at the start of the second time unit is busy, determine to perform blind detection in the second time unit.

It can be seen from the above implementation that, when a channel is monitored to be busy in the second time period at the start of the second time unit, the channel may be occupied by a device in an inter-system such as a WiFi system, or may be occupied by another device in an SL system. In this case, in combination with a state of the channel in the first time period at the end of the first time unit, it may be determined with a high probability the channel is occupied by a device of which of the systems. When the channel is idle in the first time period, it indicates that the channel is not occupied by a device in the inter-system such as the WiFi system, and thus it may be determined with a high probability that the channel may be occupied by another device in the SL system in the second time period, and therefore the terminal device needs to perform blind detection in the second time unit, to receive data transmitted by the other device in the SL system.

Figure 12:
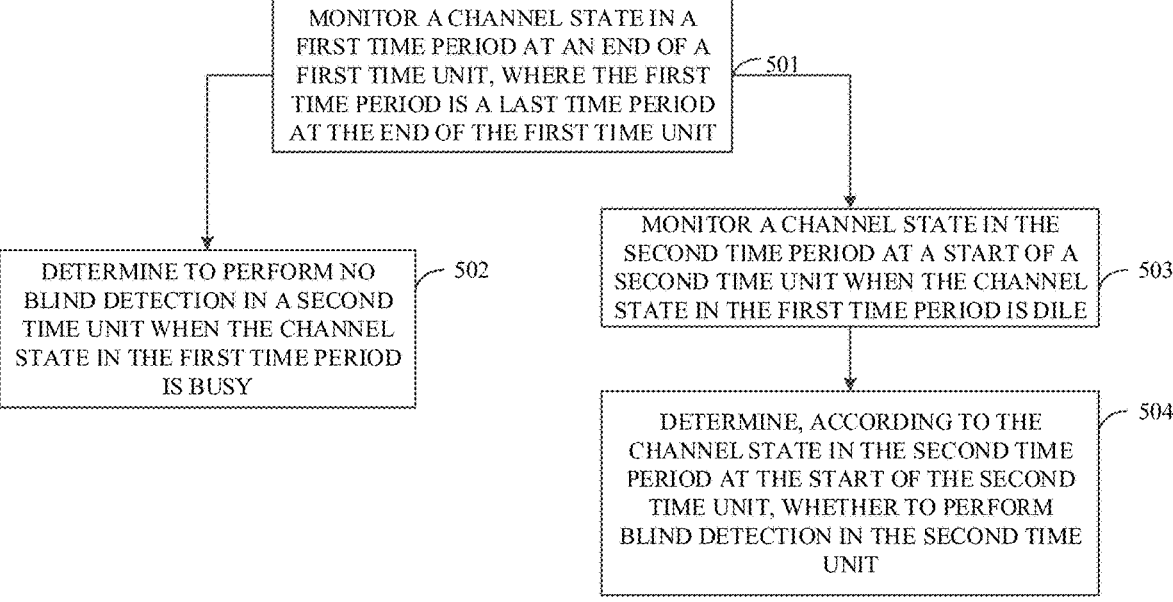
FIG. 12 is a fifth flow chart of a method for channel detection according to implementations of the disclosure.

FIG. 12 is a fifth flow chart of a method for channel detection according to implementations of the disclosure. As illustrated in FIG. 12, the method includes the following.

At 501, monitor a channel state in a first time period at an end of a first time unit, where the first time period is a last time period at the end of the first time unit.

When the channel state in the first time period at the end of the first time unit is monitored to be busy, an operation at 502 is performed.

When the channel state in the first time period at the end of the first time unit is monitored to be idle, an operation at 503 is performed.

At 502, determine to perform no blind detection in a second time unit.

At 503, monitor a channel state in a second time period at a start of a second time unit.

At 504, determine, according to the channel state in the second time period at the start of the second time unit, whether to perform blind detection in the second time unit, where the second time period is a first time period at the start of the second time unit.

In an implementation of the disclosure, when the channel state in the second time period at the start of the second time unit is monitored to be idle, determine to perform no blind detection in the second time unit.

In an implementation of the present disclosure, when the channel state in the second time period at the start of the second time unit is monitored to be busy, determine to perform blind detection in the second time unit.

In the implementation, whether to monitor the channel state in the second time period at the start of the second time unit depends on the channel state in the first time period at the end of the first time unit. When a channel is busy in the first time period at the end of the first time unit, it may be determined that a device in an inter-system such as a WiFi system performs data transmission on the channel, and it is very likely that the device in the inter-system such as the WiFi system may continue data transmission in the next time unit. In view of the scenario, the terminal device does not need to monitor the channel state in the second time unit. When the channel state in the first time period at the end of the first time unit is idle, whether to perform blind detection in the second time unit depends on the channel state in the second time period at the start of the second time unit. The determination basis is similar to that in the implementation illustrated in FIG. 10. For details, reference may be made to the foregoing.

The method for channel detection provided in the implementations of the disclosure is described in detail in the foregoing, and a terminal device provided in the implementations of the disclosure is described in the following.

Figure 13:
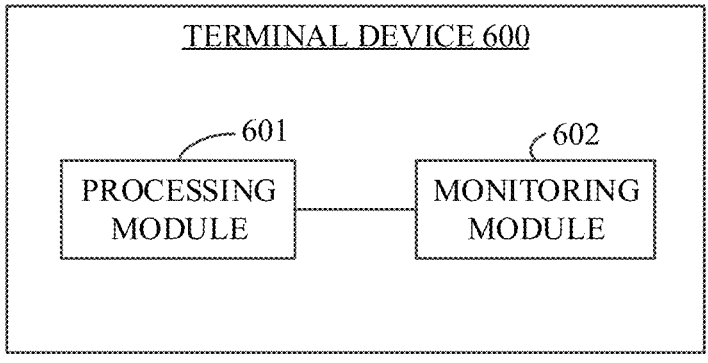
FIG. 13 is a schematic structural diagram of a terminal device according to implementations of the disclosure.

FIG. 13 is a schematic structural diagram of a terminal device according to implementations of the disclosure. As illustrated in FIG. 13, a terminal device 600 provided in the implementations of the disclosure includes a processing module 601 and a monitoring module 602.

The processing module 601 is configured to determine, according to a channel state at an end of a first time unit and/or at a start of a second time unit, whether to perform blind detection in the second time unit. The first time unit and the second time unit are consecutive in a time domain.

In an implementation of the disclosure, the monitoring module 602 is configured to monitor a channel state in a first time period at the end of the first time unit, where the first time period is a last time period at the end of the first time unit. The processing module 601 is configured to determine, according to the channel state in the first time period, whether to perform blind detection in the second time unit.

In an implementation of the disclosure, the processing module 601 is configured to determine to perform blind detection in the second time unit when the channel state in the first time period is idle, or determine to perform no blind detection in the second time unit when the channel state in the first time period is busy.

In an implementation of the present disclosure, the monitoring module 602 is configured to monitor a channel state in a second time period at the start of the second time unit, where the second time period is a first time period at the start of the second time unit. The processing module 601 is configured to determine, according to the channel state in the second time period, whether to perform blind detection in the second time unit.

In an implementation of the present disclosure, the processing module 601 is configured to determining to perform no blind detection in the second time unit when the channel state in the second time period is idle, or determine to perform blind detection in the second time unit when the channel state in the second time period is busy.

In an implementation of the disclosure, the monitoring module 602 is configured to monitor the channel state in the first time period at the end of the first time unit and the channel state in the second time period at the start of the second time unit, where the first time period is the last time period at the end of the first time unit, and the second time period is the first time period at the start of the second time unit. The processing module 601 is configured to determine, according to the channel state in the first time period and the channel state in the second time period, whether to perform blind detection in the second time unit.

In an implementation of the present disclosure, the processing module 601 is configured to determine to perform no blind detection in the second time unit when the channel state in the second time period is idle, or determine to perform no blind detection in the second time unit when the channel state in the first time period is busy and the channel state in the second time period is busy, or determine to perform blind detection in the second time unit when the channel state in the first time period is idle and the channel state in the second time period is busy.

In an implementation of the present disclosure, the monitoring module 602 is configured to monitor the channel state in the first time period at the end of the first time unit, where the first time period is the last time period at the end of the first time unit. The processing module 601 is configured to determine to perform no blind detection in the second time unit when the channel state in the first time period is busy, or determine, according to the channel state in the second time period at the start of the second time unit, whether to perform blind detection in the second time unit when the channel state in the first time period is idle, where the second time period is the first time period at the start of the second time unit.

In an implementation of the present disclosure, the monitoring module 602 is further configured to monitor the channel state in the second time period at the start of the second time unit when the channel state in the first time period is idle. The processing module 601 is configured to determine to perform no blind detection in the second time unit when the channel state in the second time period is idle, or determine to perform blind detection in the second time unit when the channel state in the second time period is busy.

In an implementation of the disclosure, performing blind detection in the second time unit includes detecting at least one of: a PSCCH, a PDCCH, a PSSCH, a PSFCH, a PSBCH, first SL control information, or second SL control information, where the first SL control information is carried on the PSCCH, and the second SL control information is carried on the PSSCH.

The terminal device provided in the implementations of the disclosure is used for executing the technical solution in any one of the foregoing method implementations, and the implementation principle and technical effect thereof are similar, and are not described herein again.

It is to be noted that, it is understood that the forgoing division of modules of the terminal device is merely division of logical functions, and in actual implementation, all or a part of modules may be integrated into a physical entity, or may be physically separated. Furthermore, all the modules may be implemented in the form of invoking software by a processing element, or may also be implemented in the form of hardware. A part of the modules may be implemented by invoking software by a processing element, and a part of the modules may be implemented in the form of hardware. For example, a processing module may be separately established, or may be integrated in a chip of the device. In addition, the processing module may also be stored in a memory of the device in the form of program codes, and is invoked by a processing element of the device to execute the forgoing functions of a processing module. Other modules can be implemented in a similar manner. All or part of the modules can be integrated together, or can be implemented separately. The processing element may be an integrated circuit, and has a signal processing capability. During implementation, each step or each module of the foregoing method may be completed by an integrated logic circuit in the form of hardware in a processor or completed in the form of software instructions.

For example, the above modules may be one or more integrated circuits configured to implement the above methods, for example, one or more application specific integrated circuits (ASICs), or one or more digital signal processors (DSPs), or one or more field programmable gate arrays (FPGAs), etc. Also, when one of the above modules is implemented in the form of scheduling program codes by a processing element, the processing element may be a general processor, for example, a central processing unit (CPU) or another processor capable of invoking the program codes. Also, these modules may be integrated together and implemented in the form of a system-on-a-chip (SOC).

All or part of the implementations described above may be implemented by software, hardware, firmware, or any combination thereof. When implemented using software, all or part of the implementations may be implemented in the form of a computer program product including one or more computer instructions. When the computer program instructions are loaded and executed on a computer, all or part of the processes or functions described in the implementations of the disclosure are generated. The computer may be a general purpose computer, a special purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (e. g., coaxial cable, fiber, digital subscriber line (DSL)), or wireless manner (e. g., infrared, wireless, microwave, etc.). The computer-readable storage medium may be any usable medium that can be accessed by a computer, or a data storage device such as a server or a data center that includes one or more usable media sets. The useable medium may be a magnetic medium (e. g., a floppy disk, a hard disk, or a magnetic tape), an optical medium (e. g., a digital video disc (DVD)), a semiconductor medium (e. g., a solid state disk (SSD)), or the like.

Figure 14:
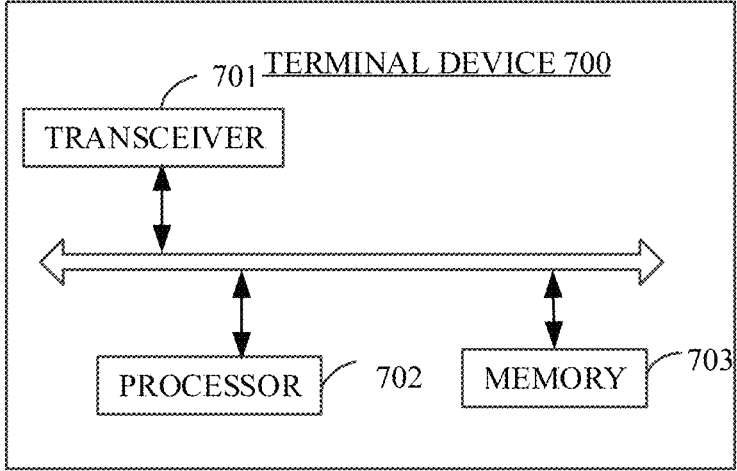
FIG. 14 is a schematic structural diagram of hardware of a terminal device according to implementations of the disclosure.

FIG. 14 is a schematic structural diagram of hardware of a terminal device according to implementations of the disclosure. As illustrated in FIG. 14, the terminal device 700 may include a transceiver 701, a processor 702, and a memory 703. The memory 703 is configured to store computer-executable instructions. The processor 702 is configured to execute the computer-executable instructions stored in the memory 703, so that the processor 702 executes the technical solution in any foregoing method implementation.

Optionally, the processor 702 may be a chip.

Implementations of the disclosure further provide a computer-readable storage medium. The computer-readable storage medium stores computer-executable instructions. The computer-executable instructions are executed by a processor to implement the technical solution performed by the terminal device in any one of the foregoing method implementations.

Implementations of the disclosure further provide a program. The program is executable by a processor to execute the technical solution performed by a terminal device in any one of the foregoing method implementations.

Implementations of the disclosure further provide a computer program product including program instructions, where the program instructions are used for implementing the technical solution performed by the terminal device in any one of the foregoing method implementations.

Implementations of the disclosure further provide a chip including a processing module and a communication interface. The processing module can execute the technical solution performed by the terminal device in the forgoing method implementations.

Further, the chip may also include a storage module (e. g. a memory). The storage module is configured to store instructions, and the processing module is configured to execute the instructions stored in the storage module, and execution of the instructions stored in the storage module enables the processing module to execute the technical solution performed by the terminal device.

In the disclosure, the expression "at least two" refers to two or more, and the expression "a plurality of" or "multiple" refers to two or more. The term "and/or" describes an association relationship between associated objects, and represents that three relationships may exist. For example, A and/or B may represent a case where A exists alone, a case both A and B exist, and a case B exists alone, where A and B may be singular or plural. The character "/" generally indicates an "or" relationship between associated objects. In the formula, the character "/" indicates a "divided" relationship between associated objects. The expression "at least one of" or the like refers to any combination of these items, including any combination of singular item(s) or plural item(s). For example, at least one of a, b, or c may represent a, b, c, a-b, a-c, b-c, or a-b-c, where a, b, and c may be singular or plural.

It is to be understood that various numerical numbers involved in the implementations of the disclosure are only used for distinguishing conveniently, and are not used to limit the scope of the implementations of the disclosure.

It is to be understood that, in the implementations of the disclosure, the sequence numbers of the foregoing processes do not imply an execution sequence, and the execution sequence of the processes should be determined according to functions and internal logics thereof, which should not constitute any limitation to the implementation process of the implementations of the disclosure.

What is claimed is:

1. A method for channel detection, comprising:

determining, according to a channel state at an end of a first time unit and/or a channel state at a start of a second time unit, whether to perform blind detection in the second time unit;

wherein the first time unit and the second time unit being consecutive in a time domain;

wherein determining, according to the channel state at the end of the first time unit and the channel state at the start of the second time unit, whether to perform blind detection in the second time unit comprises:

monitoring a channel state in a first time period at the end of the first time unit, wherein the first time period is a last time period at the end of the first time unit; and determining, according to a channel state in a second time period at the start of the second time unit, whether to perform blind detection in the second time unit when the channel state in the first time period is idle, wherein the second time period is a first time period at the start of the second time unit;

wherein determining, according to the channel state in the second time period at the start of the second time unit, whether to perform blind detection in the second time unit when the channel state in the first time period is idle, comprises:

monitoring the channel state in the second time period at the start of the second time unit only when the channel state in the first time period is idle; and determining to perform no blind detection in the second time unit when the channel state in the second time period is idle; or, determining to perform blind detection in the second time unit when the channel state in the second time period is busy.

2. The method of claim 1, further comprising:

determining to perform no blind detection in the second time unit when the channel state in the first time period is busy.

3. The method of claim 1, wherein performing blind detection in the second time unit comprises detecting at least one of:

a physical sidelink control channel (PSCCH), a physical sidelink shared channel (PSSCH), a physical sidelink feedback channel (PSFCH), a physical sidelink broadcast channel (PSBCH), first sidelink control information, or second sidelink control information;

wherein the first sidelink control information is carried on the PSCCH, and the second sidelink information is carried on the PSSCH.

4. A terminal device, comprising:

a processor; and a memory configured to store a computer program;

wherein the processor is configured to execute the computer program to cause the terminal device to:

determine, according to a channel state at an end of a first time unit and a channel state at a start of a second time unit, whether to perform blind detection in the second time unit;

wherein the first time unit and the second time unit are consecutive in a time domain;

wherein the processor configured to execute the computer program to cause the terminal device to determine, according to the channel state at the end of the first time
unit and the channel state at the start of the second time
unit, whether to perform blind detection in the second
time unit is configured to execute the computer pro-
gram to cause the terminal device to:

monitor a channel state in a first time period at the end
of the first time unit, wherein the first time period is
a last time period at the end of the first time unit; and determine, according to a channel state in a second time
period at the start of the second time unit, whether to
perform blind detection in the second time unit when
the channel state in the first time period is idle,
wherein the second time period is a first time period
at the start of the second time unit;

wherein the processor configured to execute the computer
program to cause the terminal device to determine,
according to the channel state in the second time period
at the start of the second time unit, whether to perform
blind detection in the second time unit when the
channel state in the first time period is idle is configured
to execute the computer program to cause the terminal
device to:

monitor the channel state in the second time period at
the start of the second time unit only when the
channel state in the first time period is idle; and determine to perform no blind detection in the second
time unit when the channel state in the second time
period is idle; or, determine to perform blind detec-
tion in the second time unit when the channel state in
the second time period is busy.

5. The terminal device of claim 4, wherein the processor
is further configured to execute the computer program to
cause the terminal device to:

determine to perform no blind detection in the second
time unit when the channel state in the first time period
is busy.

6. The terminal device of claim 4, wherein the processor
configured to execute the computer program to cause the
terminal device to perform blind detection in the second
time unit is configured to execute the computer program to
cause the terminal device to detect at least one of:

a physical sidelink control channel (PSCCH), a physical
sidelink shared channel (PSSCH), a physical sidelink
feedback channel (PSFCH), a physical sidelink broad-
cast channel (PSBCH), first sidelink control informa-
tion, or second sidelink control information;

wherein the first sidelink control information is carried on
the PSCCH, and the second sidelink information is
carried on the PSSCH.

7. A non-transitory computer-readable storage medium
storing a computer-executable instruction, and the com-
puter-executable instruction being executable by a processor
of a terminal device to cause the terminal device to:

determine, according to a channel state at an end of a first
time unit and/or a channel state at a start of a second
time unit, whether to perform blind detection in the
second time unit;

wherein the first time unit and the second time unit are
consecutive in a time domain;

wherein the computer-executable instruction executable
by the processor of the terminal device to cause the
terminal device to determine, according to the channel
state at the end of the first time unit and the channel
state at the start of the second time unit, whether to
perform blind detection in the second time unit is
executable to cause the terminal device to:

monitor a channel state in a first time period at the end
of the first time unit, wherein the first time period is
a last time period at the end of the first time unit; and determine, according to a channel state in a second time
period at the start of the second time unit, whether to
perform blind detection in the second time unit when
the channel state in the first time period is idle,
wherein the second time period is a first time period
at the start of the second time unit;

wherein the computer-executable instruction executable
by the processor of the terminal device to cause the
terminal device to determine, according to the channel
state in the second time period at the start of the second
time unit, whether to perform blind detection in the
second time unit when the channel state in the first time
period is idle is executable to cause the terminal device
to:

monitor the channel state in the second time period at
the start of the second time unit only when the
channel state in the first time period is idle; and determine to perform no blind detection in the second
time unit when the channel state in the second time
period is idle; or, determine to perform blind detec-
tion in the second time unit when the channel state in
the second time period is busy.

8. The non-transitory computer-readable storage medium
of claim 7, wherein the computer-executable instruction
executable to cause the terminal device to perform blind
detection in the second time unit is executable to cause the
terminal device to detect at least one of:

a physical sidelink control channel (PSCCH), a physical
sidelink shared channel (PSSCH), a physical sidelink
feedback channel (PSFCH), a physical sidelink broad-
cast channel (PSBCH), first sidelink control informa-
tion, or second sidelink control information;

wherein the first sidelink control information is carried on
the PSCCH, and the second sidelink information is
carried on the PSSCH.

* * * * *